UNITED STATES PATENT OFFICE.

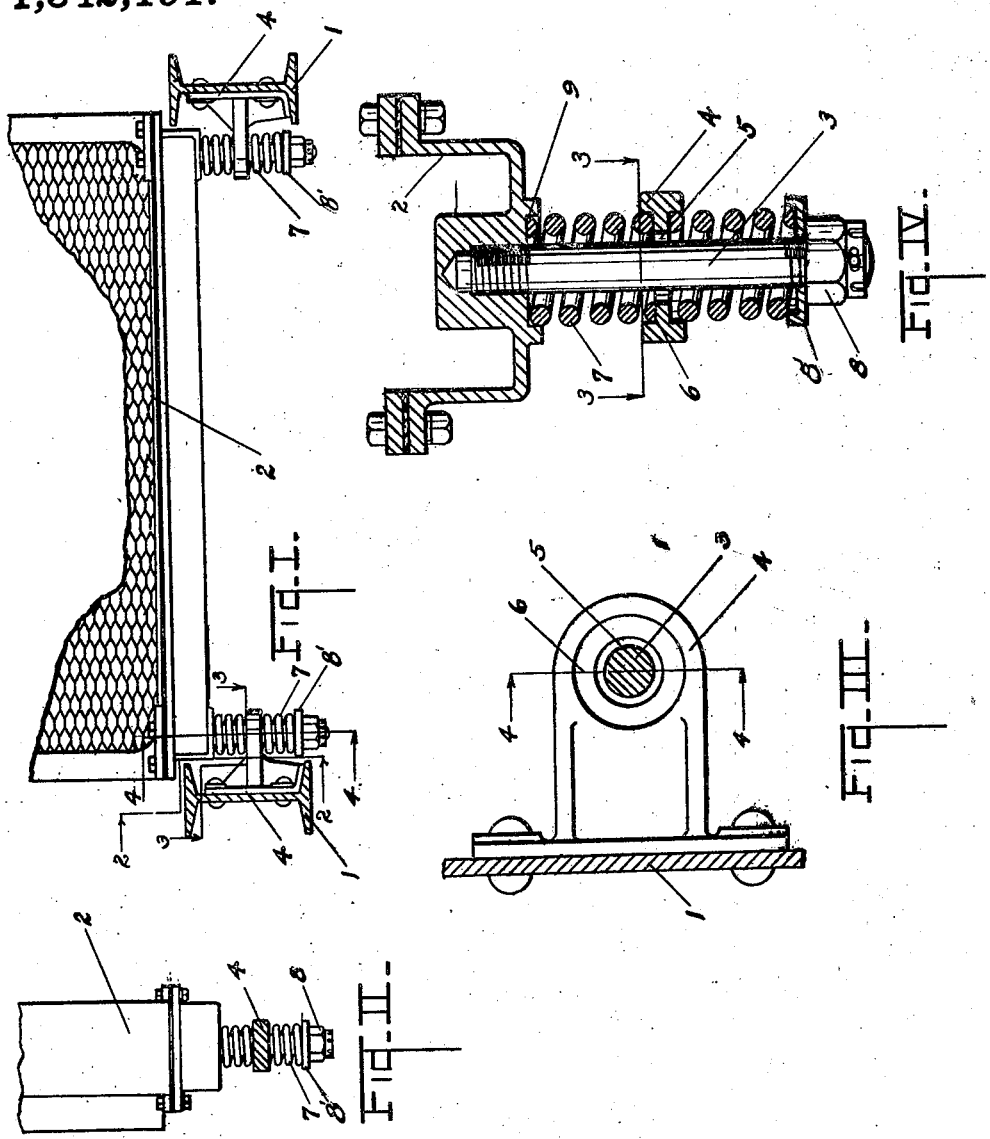
G. J. THOMAS.
RADIATOR MOUNTING FOR MOTOR VEHICLES.
APPLICATION FILED AUG. 31, 1918. RENEWED DEC. 15, 1919.
1,342,191. Patented June 1, 1920.

GEORGE J. THOMAS, OF LANSING, MICHIGAN, ASSIGNOR TO DUPLEX TRUCK COMPANY, OF LANSING, MICHIGAN.

RADIATOR-MOUNTING FOR MOTOR-VEHICLES.

1,342,191.    Specification of Letters Patent.    Patented June 1, 1920.

Application filed August 31, 1918, Serial No. 252,154. Renewed December 15, 1919. Serial No. 345,123.

*To all whom it may concern:*

Be it known that I, GEORGE J. THOMAS, a citizen of the United States, residing at Lansing, Michigan, have invented certain new and useful Improvements in Radiator-Mountings for Motor-Vehicles, of which the following is a specification.

This invention relates to improvements in radiator mountings for motor vehicles.

The main object of this invention is to provide an improved mounting for motor vehicle radiators by which the radiator is supported so as to be relieved from the racking strains and stresses to which the chassis of the vehicle is subjected or so that said racking strains and stresses are not imparted thereto.

Further objects, and objects relating to details and economies of construction and operation will definitely appear from the detailed description to follow.

I accomplish the objects of my invention by the devices and means described in the following specification. The invention is clearly defined and pointed out in the claims.

A structure constituting a preferred embodiment of my invention is illustrated in the accompanying drawing forming a part of this specification, in which:

Figure I is a detail front elevation of a structure embodying the features of my invention, the longitudinal members only of the vehicle chassis being rigid, the same being shown conventionally.

Fig. II is a detail section on a line corresponding to broken line 2—2 of Fig. I.

Fig. III is a detail horizontal section on a line corresponding to line 3—3 of Figs. I and IV.

Fig. IV is a detail view partially in section on a line corresponding to line 4—4 of Fig. III.

Referring to the drawing, 1, 1 represents the longitudinal members of the running gear frame of the chassis of a motor vehicle, and 2 the radiator. These parts are shown mainly in conventional form. Supporting bolts 3 project downwardly from the radiator, the bolts being rigid and vertically disposed.

Supporting brackets 4 are mounted on the chassis members 1, 1 and project inwardly below the radiator. These brackets have holes 5 therein for the bolts 3, the holes being of such diameter as to permit lateral movement of the bolts therein, there being a substantial space surrounding the bolts, as shown in Fig. III.

Concentrically with the bolt holes on each side of the brackets are seats 6 for the coil springs 7. The coil springs are arranged on the bolts above and below the brackets, the bolts being provided with castellated nuts 8 at their lower ends which support the lower ends of the lower springs. These springs are seated in the bracket seats and supported against lateral shifting thereby and by the seats in the washer-like plates 8'.

The radiator is provided with seats 9 for the upper ends of the upper springs. Both springs are normally under tension. By this arrangement, the radiator is supported so that the torsional and other strains to which the chassis is subjected in use are not transmitted to the radiator and the radiator is also relieved of severe shocks which might open its seams or injure the same.

I have illustrated and described my improvements as I have embodied the same for use on motor trucks. I have not attempted to illustrate or describe other embodiments or adaptations as I believe the disclosure made will enable those skilled in the art to which my invention relates, to embody or adapt the same as may be desired.

Having thus described my invention, what I claim as new and desire to secure by Letters Patent is:

1. The combination with the longitudinal members of a motor vehicle chassis, of a radiator, rigid downwardly projecting bolts on said radiator having spring seats at their bases, inwardly projecting brackets on said chassis members provided with holes for said bolts, the diameter substantially exceeding that of the bolts permitting lateral movement of the bolts therein, said brackets having spring seats in the tops and bottoms thereof concentric with the bolt holes, castellated nuts on lower ends of said bolts, spring supporting plates carried by said nuts provided with spring seats, and springs arranged on said bolts above and below said brackets engaging said seats thereof and the seats at the bases of said bolts and in said supporting plates whereby the springs are laterally supported, both springs of each bolt being normally under tension.

2. The combination with a motor vehicle chassis, of a radiator, rigid vertically disposed bolts on said radiator, brackets on said chassis provided with holes for said bolts of a diameter exceeding that of the bolts permitting lateral movement of the bolts therein, spring supporting members on the lower ends of said bolts, said brackets, spring supports and radiator being provided with spring seats supporting the springs engaging therewith against lateral movement, and springs arranged on said bolts above and below said brackets engaging said seats, both springs for each bolt being normally under tension.

3. The combination with a motor vehicle chassis, of a part mounted thereon provided with rigid vertically disposed bolts, brackets on said chassis provided with holes for said bolts of a diameter exceeding that of the bolts permitting lateral movement of the bolts therein, spring supporting members on said bolts, said brackets, spring supporting members and mounted part being provided with spring seats supporting the springs engaged therewith against lateral movement and springs arranged on said bolts above and below said brackets and engaging said seats, both springs for each bolt being normally under tension.

In witness whereof, I have hereunto set my hand and seal in the presence of two witnesses.

GEORGE J. THOMAS. [L. S.]

Witnesses:
 H. M. LEE,
 G. W. HEWITT.